May 17, 1960 W. S. BLUME 2,936,563
ROTARY LAWNMOWER AND ATTACHMENT THEREFOR
Filed Sept. 26, 1956
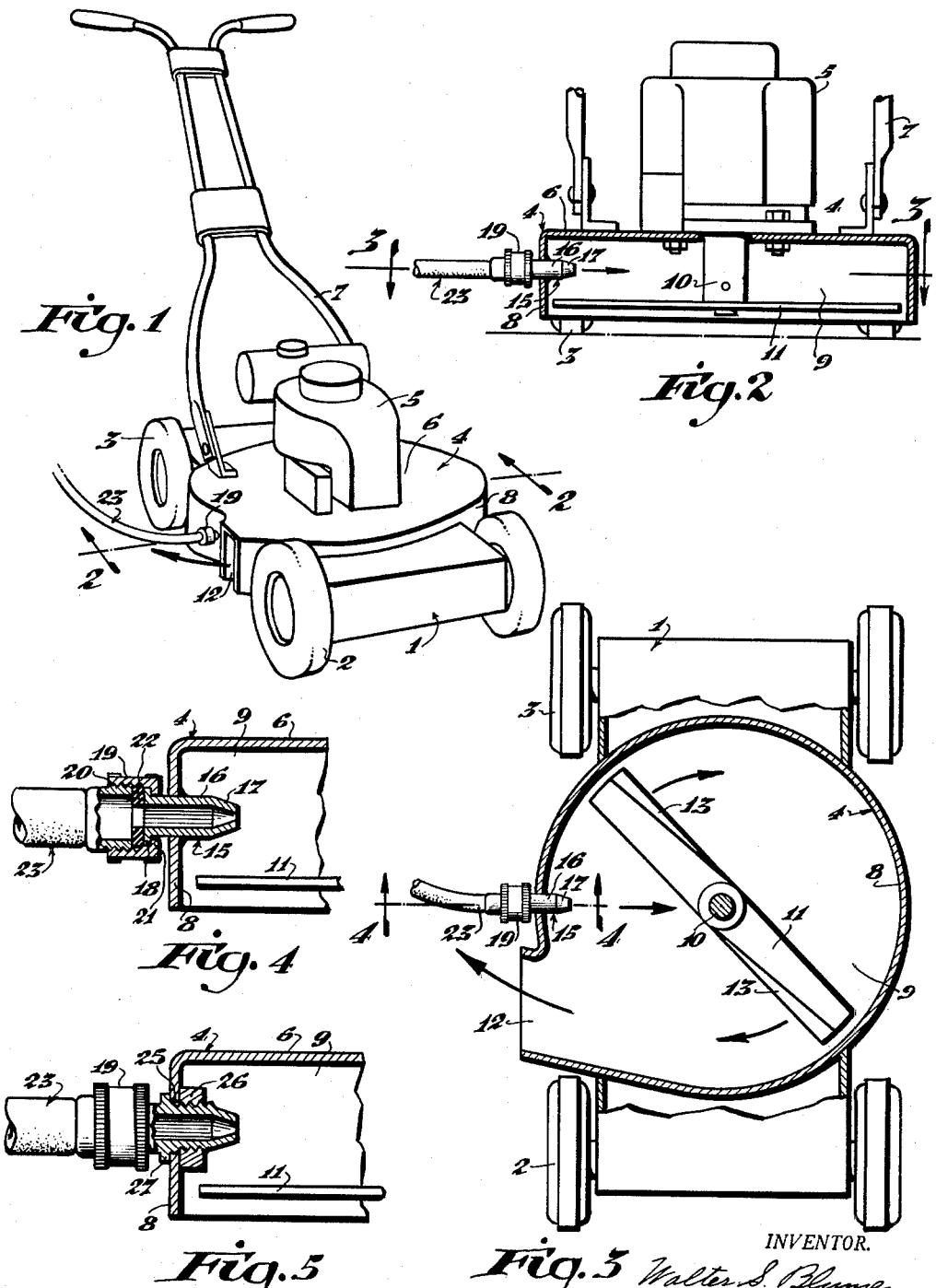
INVENTOR.
Walter S. Blume
BY Wood, Herron & Evans
Attorneys

United States Patent Office 2,936,563
Patented May 17, 1960

2,936,563

ROTARY LAWNMOWER AND ATTACHMENT THEREFOR

Walter S. Blume, Cincinnati, Ohio, assignor to Sunbeam Corporation, Chicago, Ill., a corporation of Illinois Application September 26, 1956, Serial No. 612,304

6 Claims. (Cl. 56—25.4)

This invention relates to rotary type lawnmowers wherein a blade rotatable at high speed in a horizontal plane operates within a housing having wheels for sustaining the blade at a predetermined level above the ground.

In the operation of lawnmowers of this type, grass, weeds, or brush are severed to a predetermined height as the rotating blade passes through them. The housing is equipped with one or more discharge outlets through which the clippings are expelled and the blade and housing are usually constructed to cause the clippings to be subdivided before discharge. In the operation of such equipment, clippings inevitably are thrown against the interior surfaces of housing, and some of the clippings adhere thereto and compact and accumulate. Use of the mower in wet grass aggravates this condition, but even so, it is frequently necessary for the operator to stop the mower, turn it on its side, and remove the accumulations with a stick or tool. If this is not done, grass cuttings or debris accumulate sufficiently to clog the discharge opening or overload the mower, with the result that the cutting operation is not nearly as efficient as it should be. If the accumulated clippings are not removed while wet, they dry upon the surface during mower storage and not only change the interior contours of the blade chamber but are then difficult to remove.

The principal objective of this invention has been to provide means through which accumulated or adherent clippings may be removed from the blade chamber in an easy and convenient manner without the use of tools or tipping of the mower, such that the blade chamber readily may be maintained in a clean and efficient state.

In accordance with this invention, the blade chamber of the rotary mower is cleaned in an efficient and convenient manner by conjoint action of the rotating mower blade and water delivered into contact with the blade from a conduit fitting which extends to the exterior of the housing where it is equipped for connection to a hose, gravity water supply, or other water source. The invention is directed not only to rotary power mowers having a built-in water conduit but also to individual fittings adapted for equipping various types of rotary mowers now in use.

At the interior of the blade chamber the conduit furnishes a stream of water which, when caught by the blade, is projected at high velocity upon all of the chamber surfaces with sufficient force to scour adherent grass clippings therefrom and thereby leave the blade chamber surfaces in a clean condition. The clippings and debris removed from the housing surfaces in this manner are expelled automatically, some through the discharge opening of the housing and the remainder dropping from the housing which, of course, is open at the bottom. Periodic cleansing in this manner maintains the interior housing surfaces in a clean, smooth state, thereby promoting the expulsion and even distribution of grass clippings through the mower outlet when it is next used and preventing clogging and resultant overloading of the mower which would otherwise occur.

While water is supplied to the water conduit most conveniently from a garden hose, it is to be understood that the hydraulic scouring effect at the housing interior is not dependent upon nozzle velocity but is obtained through the centrifugal action provided by the flinging of the water from the mower blade while the motor is in operation. Therefore, when a garden hose connection is employed, it is not necessary for the hose to be turned on full stream, although no undesirable action occurs if this is done. In place of a garden hose, water may be fed to the interior of the housing under a gravity head if desired. Prompt and efficient cleansing of the surface is accomplished with only a small quantity of water, for example, a gallon more or less depending upon the extent to which clippings have accumulated or dried upon the blade chamber surfaces.

The water conduit may be mounted at any suitable point on the housing for either vertical or sidewise water feed, it merely being requisite that the outlet end of the water conduit be so located that a stream from it will be caught by the blade at some point in its descent. Because of this, mowers of various types now in use readily may be equipped with water conduit fittings merely by drilling through the housing at an appropriate point a hole sufficiently large to receive the conduit and permit it to be fastened in place. In general, sidewise water feed is preferred with most types of rotary lawnmowers now in use since a more efficient action is generally obtained thereby.

In the accompanying drawings illustrating typical embodiments of my invention:

Figure 1 is a perspective view of a rotary type lawnmower equipped in accordance with the present invention;

Figure 2 is a cross-sectional elevation taken on the line 2—2 of Figure 1;

Figure 3 is a sectional plan view taken on the line 3—3 of Figure 2;

Figure 4 is an enlarged fragmentary sectional view taken along line 4—4 of Figure 3, showing in cross-section one means for delivering water to the blade chamber in accordance with this invention; and Figure 5 is a view similar to Figure 4 showing another type of water connection adapted for use as an attachment to an existing mower.

The lawnmower shown in Figure 1 comprises a chassis indicated generally at 1 having front and rear wheels 2 and 3, respectively, intermediate which the chassis embodies a blade housing indicated generally at 4. A power motor 5 is mounted upon the top surface 6 of the blade housing 4, and a handle 7 extends from the chassis in any suitable manner to permit the mower to be pushed through grass which is to be cut. In some instances, one set of wheels 2 or 3 is powered for self-propulsion of the chassis, and, of course, various other structural designs are employed in mowers of various makes, but the unit shown generally in Figure 1 is typical of equipment of the type to which the present invention is addressed.

Blade housing 4 has a circumferential skirt 8 which projects downwardly from the top surface 6 to form a blade chamber 9. From the power motor 5 a rotatable shaft 10 extends downwardly to carry cutting blade 11 which operates within the housing 9. The circumferential skirt 8 is spaced from the extremities of the blade 11 to provide operating clearance, and the housing is provided with the usual outlet 12 through which grass clippings are discharged. Blade 11 is spaced above ground level a distance corresponding to the height to which the grass is to be cut, and the skirt 8 also terminates above ground level, but usually, for safety purposes, it extends slightly below the plane of rotation of blade 11. The leading edges of the opposed portions of blade 11 are sharpened as at 13 through which angulation, or through other suitable blade configuration, a fan action is produced through high-speed rotation of the blade whereby cuttings of grass are thrust upwardly as well as centrifugally toward the housing walls for discharge through the outlet 12.

From the construction described, it will be seen that in a typical rotary lawnmower clippings of grass are thrown at random about the housing interior even though the general path of movement is toward outlet 12. The housings of some types of mowers are provided with internal surface configurations which are deliberately intended to insure residence of the clippings sufficiently long to cause them to be subdivided rather finely before discharge.

Especially when the grass is wet, some clippings thrown into contact with the interior surfaces of the housing adhere thereto and accumulations form which interfere with the intended normal operation of the unit. For instance, if the clippings build up adjacent the blade periphery such that the tips of the blade rotate virtually in a groove through the clippings accumulated on the housing interior, an undue load or drag is exerted on the power motor 5 and it tends to stall. If the clippings adhere at the top area or especially at the corners where the top joins the skirt 8, they interfere with the intended air flow toward the discharge end and thereby reduce the efficiency of the unit and cause grass clippings to be discharged non-uniformly from the outlet. Although these occurrences are not always sufficient to require shutdown of the motor at periodic intervals, still, if the adherent clippings become dried out during storage of the mower before the next use, manual cleaning of the housing may be required and this is a considerable nuisance.

In accordance with this invention, the housing is equipped with a water conduit indicated generally at 15 through which a stream of water conveniently may be delivered to the blade chamber from the housing exterior through a garden hose connection or the like, either periodically or at such time as cleaning is required. The water conduit shown in Figure 4 of the drawings comprises a tubular pipe section 16 which, if desired, may have a convergent inner endwise portion 17. Conduit 16, as an integral part of the housing or as a sub assembly fastened by welding, extends from the interior portion 9 of the blade housing through skirt 8 to the exterior where it is equipped to receive a water supply line. In the illustrated construction, conduit 16 terminates in an outwardly extending flange 18 while a female hose connector 19 which is threaded at its entrance portion 20 carries an inwardly extending annular flange 21 at its rearward portion which surrounds conduit 16. The inwardly extending flange 21 abutting the outwardly extending flange 18 keeps the hose connector in place on the conduit, and the mouth of the connector may carry the usual washer 22 which forms a water-tight connection when the male end of a garden hose, indicated generally at 23, is attached to the connector.

Water supplied through the hose in the form of a small stream passes to the interior of the blade housing where it may either impinge on the hub portion of the blade shaft, or, if under less pressure, where it may fall arcuately toward the blade. In either instance, when the blade is under rotation at a normal rate, as in cutting grass, the water delivered to the housing interior is caught by the blade and slung about centrifugally with such force that it impinges upon all of the interior surfaces of the housing. In this manner, an hydraulic scouring effect is produced which effectively loosens and dislodges accumulations of grass clippings whether they be wet or dried. Clippings adherent to the blade itself, which sometimes appear when the blade is dull, also are removed, and the housing interior thereby is restored to an original state of cleanliness and efficiency. The water connection may then be separated before use of the mower in the usual manner.

In the claims the term circumferential wall is intended to include the skirt 8 and top 6 of the housing 4 since the water conduit may be located at any suitable point on the blade housing for sidewise delivery as shown, or for delivery of the water stream in a vertical or angularly downward direction. Also, the advantages of the invention may be utilized through an attachment, one type of which is shown in Figure 5. In this instance, a hole 25 suitable to receive a barrel portion of the water conduit is drilled through the housing wall at a suitable location to receive a water conduit attachment having the same or other suitable type of hose connection as described in connection with Figure 4. However, in this case the barrel portion of the housing is threaded externally to receive a nut 26 which cooperates with an annular flange 27 extending from the conduit barrel at the exterior of the mower. Such an attachment may be inserted through the opening and held in place by tightening of the nut 26.

Having described my invention, I claim:

1. In a rotary lawnmower, the combination comprising a housing having a circumferential wall containing an outlet opening, a substantially central power shaft, and a blade connected to the power shaft for rotation within the housing in a substantially horizontal plane, the improvement which comprises conduit means connected to the housing for delivering water to the interior thereof at a level above the blade therein whereby rotation of the blade within the housing causes water admitted from the conduit to be flung about the interior surfaces of the housing with force sufficient to dislodge grass clippings adherent thereto.

2. A rotary lawnmower having a blade housing, a blade rotatably operable in a horizontal plane within said housing, power means external to said housing for operating said blade, and a water conduit having means external to said housing for connection to a water supply and having nozzle means interior of said housing for delivering a stream of water to said blade during operation of said blade by said power means whereby energy imparted to said blade from said power means is imparted to water from said stream sufficiently for the water to scrub from the interior surfaces of the housing grass clippings adherent therein.

3. A rotary lawnmower having a blade housing comprising a top member and a depending circumferential skirt, a blade rotatably operable in a horizontal plane within said housing, power means carried by said top member for operating said blade, and a water conduit connected to said circumferential skirt and extending therethrough, the portion of said conduit external to said housing having a coupling connectable to a water supply and the portion of said conduit internal of said housing being positioned to deliver a stream of water therefrom to said blade during operation of said blade by said power means whereby energy imparted to said blade from said power means is imparted to water from said stream sufficiently for the water to scrub from the interior surfaces of the housing grass clippings adherent thereon.

4. In a rotary lawn mower, the combination comprising a housing having a circumferential wall containing an outlet opening, a substantially central power shaft, and a blade connected to the power shaft for rotation within the housing in a substantially horizontal plane, said blade rotating past said outlet opening, the improvement which comprises conduit means connected to and extending through said circumferential wall for delivering water to the interior thereof at a level above the blade therein whereby rotation of the blade within the housing causes water admitted from the conduit to be flung about the interior surfaces of the housing with force sufficient to dislodge grass clippings adherent thereto.

5. A rotary lawn mower as in claim 4, said housing comprising an inverted cup-shaped member, said shaft being vertically extending and supported centrally of said housing for rotation thereon, power means carried by said housing and drivingly connected to said shaft, said blade secured to the lower end of said shaft, said conduit comprising a water nozzle having connector means secured to one end of said nozzle, said housing having an opening positioned therein above the plane of said blade for receiving said nozzle therein, said nozzle being positioned and directed to deliver water centrally of said housing above the plane of said blade whereby said water will be thrown radially and upwardly by said blade means with sufficient force to remove any grass deposits from the interior surface of said housing.

6. A rotary lawn mower as in claim 4, said housing comprising an inverted cup-shaped member, said shaft being vertically extending and supported centrally of said housing for rotation thereon, power means carried by said housing and drivingly connected to said shaft, said blade secured to the lower end of said shaft, said conduit comprising a water nozzle having connector means secured to one end of said nozzle, said housing having an opening positioned therein above the plane of said blade for receiving said nozzle therein, said nozzle being positioned to direct a stream of water against a portion of said shaft between said blade and said housing through which said shaft extends.

References Cited in the file of this patent

UNITED STATES PATENTS

| | | |
|---|---|---|
| 599,825 | Bidwell | Mar. 1, 1898 |
| 1,336,257 | Muzzy | Apr. 6, 1920 |
| 1,631,381 | Nelson | June 7, 1927 |
| 1,752,823 | Walker | Apr. 1, 1930 |
| 2,155,220 | Ehret | Apr. 18, 1939 |
| 2,566,324 | Frese | Sept. 4, 1951 |
| 2,661,240 | Salomonsson | Dec. 1, 1953 |
| 2,708,818 | Gentry et al. | May 24, 1955 |
| 2,742,751 | Laughlin | Apr. 24, 1956 |
| 2,750,708 | Handfield | June 19, 1956 |
| 2,796,714 | Denney | June 25, 1957 |